Oct. 19, 1965        H. P. WILLETT        3,212,761
GAS QUENCHER
Filed Jan. 14, 1963
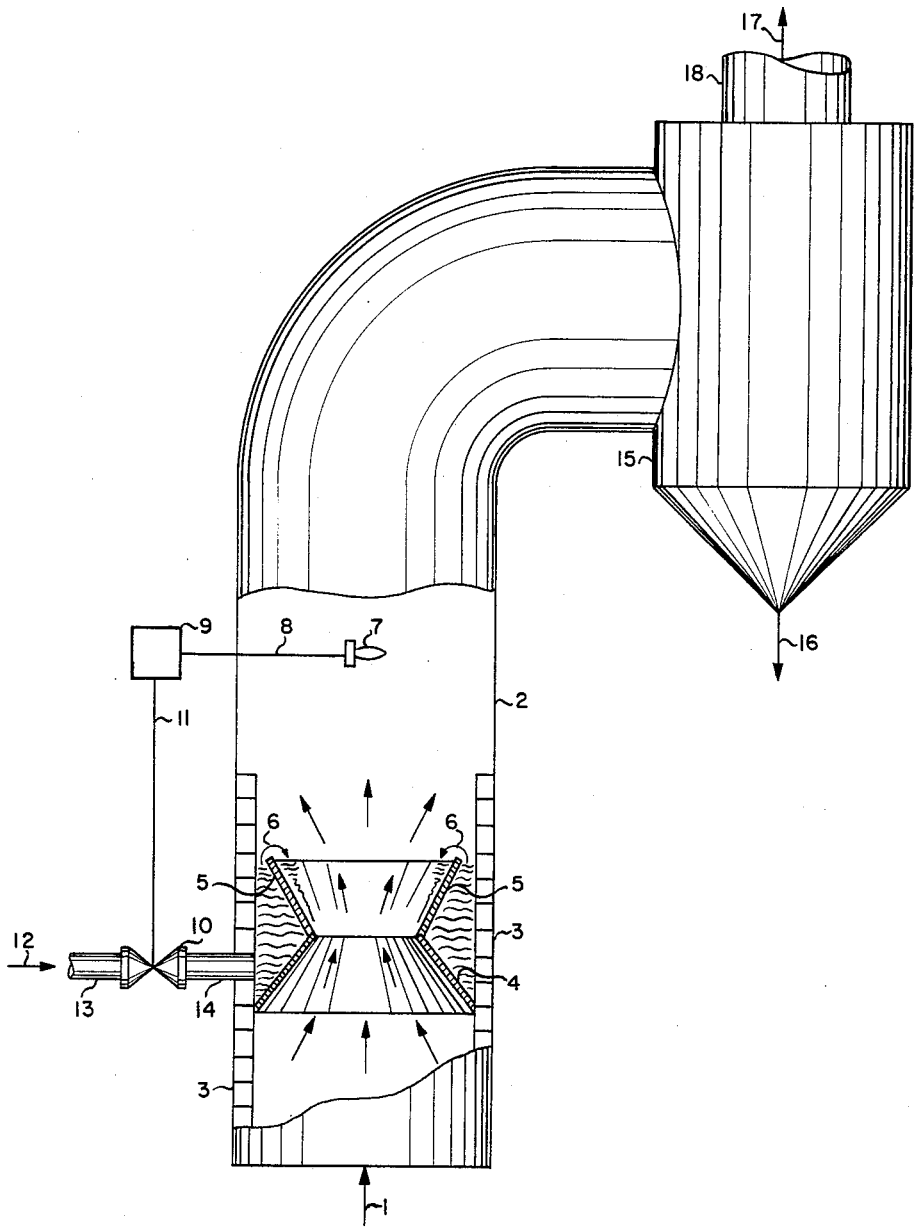
HOWARD P. WILLETT
*INVENTOR.*
BY J. J. Chaloty
AGENT

United States Patent Office 3,212,761
Patented Oct. 19, 1965

3,212,761
GAS QUENCHER
Howard P. Willett, Darien, Conn., assignor to Chemical Construction Corporation, New York, N.Y., a corporation of Delaware
Filed Jan. 14, 1963, Ser. No. 251,123
2 Claims. (Cl. 261—39)

This invention relates to the quench cooling of hot gas streams. An improved apparatus is provided, which accomplishes the rapid and complete cooling of hot gas streams derived from furnaces, ovens or other sources. The device is readily regulated so as to achieve cooling of the gas stream to a constant final temperature level.

Various types of devices for regulating the temperature or for the quench-cooling of a hot gas stream have been proposed and developed in the prior art. These devices may employ either indirect heat exchange or direct contact between the hot gas stream and a cooling fluid such as water. The present invention provides an improved apparatus which accomplishes the desired quench-cooling by direct contact between the hot gas stream and a cooling liquid such as water. All of the cooling effect in the present case is obtained by vaporization of the cooling liquid into the hot gas stream, thus it is also contemplated that no unvaporized liquid may remain in the final gas stream.

In the present invention, the hot gas stream is directed upwards through a refractory-lined or water jacketed conduit. A constriction in the flow path is provided by a baffle which extends into the conduit from the inner wall, sloping upwards and terminating at a centrally positioned opening. Thus, a venturi type of apparatus is obtained, with an accelerated gas flow rate at the baffle section. Water or other quench liquid is passed into the space between the baffle and the conduit wall, and overflows the upper edge of the baffle. Due to the high gas flow velocity, the water overflowing the edge of the baffle does not fall downwards into the conduit but instead is swept upwards and is dispersed throughout the gas stream. The water is thus vaporized into the gas stream, and a rapid and uniform cooling effect is obtained.

In a preferred embodiment, the water flow rate is regulated as a function of the final gas stream temperature, so as to produce a cooling effect which yields a constant final gas stream temperature, regardless of process upsets. In addition, the best mode of carrying out the invention contemplates the provision of an upper second baffle, extending upwards and outwards from the upper end of the lower first baffle. The upper second baffle terminates adjacent to the wall of the conduit, with a clearance spacing between the upper end of the upper second baffle and the conduit wall for liquid flow. The quench water thus passes over the upper end of the upper second baffle rather than the first, and flows down the inner surface of the upper second baffle before contact with the gas stream.

The apparatus arrangement of the present invention provides several advantageous features. The apparatus consists of a combination of simple elements, however, the co-action which is achieved results in highly effective dispersion of quench liquid and cooling of the gas stream. The apparatus is applicable to a variety of hot gas streams, even those of a corrosive or erosive nature, because the venturi configuration of the baffle elements prevents contact between the hot gas stream and the quench liquid while in proximity to the hot lower baffle surface. In other words, the exposed surface of the lower first baffle is not wetted by the quench liquid. In addition, retention of quench liquid between the lower first baffle and the conduit wall serves to cool the lower first baffle by direct heat transfer to the liquid, thus preventing overheating of the lower first baffle and concomitant deterioration.

It is an object of the present invention to quench-cool hot gas streams in an improved manner.

Another object is to provide an improved apparatus for the quench-cooling of hot gas streams.

A further object is to quench-cool hot gas streams in a rapid and uniform manner.

An additional object is to provide an improved apparatus for the quench-cooling of a hot gas stream to a constant final temperature, regardless of process fluctuations.

An object is to provide an improved apparatus for dispersion of a cooling liquid into a hot gas stream.

These and other objects and advantages of the present invention will become evident from the description which follows. Referring to the figure, which presents a preferred embodiment of the present invention, a hot gas stream 1 such as the exit gas from a steel blast furnace, passes upwards through the conduit 2, which is lined with refractory lining 3. As an alternative, conduit 2 may be water-jacketed. Conduit 2 is preferably circular in cross-section, however a rectangular duct may be employed in cases of low gas velocity. In the description infra, conduit 2 will be considered to be of circular cross-section.

The gas stream inside conduit 2 is directed into a converging flow path by baffle 4, which is in the form of a truncated cone. Thus, the gas stream velocity is accelerated. The gas stream flow path is then gradually enlarged by conical baffle 5, which extends upwards and outwards from the upper end of baffle 4. Water is passed into the annular space between baffles 4–5 and the refractory lining 3. This water flows over the upper end of baffle 5 via 6, and then flows down the inner surface of baffle 5. The water is then dispersed into the upwardly flowing gas stream, and is vaporized. Thus the water serves to quench-cool the gas stream to a lower temperature.

The cooled rising gas stream now passes upwards in the conduit 2 above the refractory-lined section 3, and contacts temperature element 7. The temperature of the cooled gas stream is thus measured and transmitted via 8 to controller 9. If the temperature of the gas stream varies from a desired level, the change is compensated by controller 9, which controls the setting of control valve 10 via 11. The quench water input stream 12 is admitted via duct 13 and passes through valve 10, passing next via duct 14 into the annular space between ducts 4–5 and refractory lining 3 for eventual discharge via 6. Thus, the flow rate of cooling water stream 6 is controlled as a function of the final cooled gas stream temperature.

The cooled gas stream may now pass to suitable means for removal of entrained or agglomerated particles, which may form due to gas cooling. The removal means may comprise an entrainment filter, however any suitable means may be employed. In the present case, a cyclonic type of separator is shown in the figure. Thus, the gas stream passes tangentially into cyclonic separator 15 from duct 2. Centrifugal force moves the solid particles to the inner wall of the separator, and thereafter the solid particles move down the inner wall of the unit for removal via 16. The gas stream 17, now free of entrained particles, is discharged from separator 15 via outlet 18. It will be understood that the provision of a unit such as separator 15 is optional, thus unit 15 and its function may be omitted in suitable instances.

Numerous alternatives may be practiced within the scope of the present invention. Thus, if conduit 2 is rectangular, baffles 4 and 5 would each consist of flat opposed elements rather than a continuous curved conical baffle. In addition, the provision of baffle 5 represents preferred embodiment of the present invention. Thus baffle 5 may be omitted if desired, with the quench-cooling water flowing over the upper end of baffle 4 and into the gas stream. Other quench liquids besides water may be employed in suitable instances. For example, stream 1 could consist of a hot fuel gas such as town gas or purified coke oven gas. In this case, stream 6 could consist of a suitable hydrocarbon liquid such as naphtha which would be added to the fuel gas stream for enrichment purposes.

It is felt that the apparatus of the present invention is most useful in regulating the temperature of the gas streams being sent to electrical precipitators. However, the present invention provides an apparatus which could be inserted in any flue to cool the hot gas stream and thus dispense with the need for refractory linings. Only the lower portion of the flue would need to be lined with a refractory.

Although as mentioned supra the outwardly inclined baffle 5 may be omitted in suitable instances, it is felt that inclusion of element 5 is most desirable. Thus, turbulence in the gas stream may cause surging of the liquid behind the baffle causing water to spill over the edge of the baffle after the valve 10 has been closed. Such an occurrence might cause undue cooling of the gas stream. To overcome this, the exposed surface of the water is decreased by providing the outwardly inclined baffle 5, which restricts the open area of water behind the baffle.

What I claim is:

1. Apparatus for quenching a hot gas stream which comprises a vertically oriented conduit, means to pass a hot gas stream upwards through said conduit, a first inclined baffle extending inwards and upwards from fluid-impervious attachment to the inner wall of said conduit, the upper end of said first baffle defining a central opening which is coaxial with said conduit, whereby the flow of hot gas is restricted and its velocity is increased, a second inclined baffle extending upwards and outwards from fluid-impervious attachment to the upper end of said first baffle, said second baffle terminating with an upper edge adjacent to the inner wall of said conduit, a liquid supply duct, said duct extending through the wall of said conduit, means to pass quench liquid through said duct, whereby said quench liquid passes into the annular section between said baffles and said conduit, a temperature sensitive element, said element being disposed within said conduit above said second baffle and serving to measure the temperature of said gas stream above said second baffle, a controller external to said conduit, means to transmit a signal proportional to gas stream temperature from said element to said controller, a control valve, said control valve being disposed within said duct, and means to transmit a control signal from said controller to said control valve, whereby the flow rate of quench liquid through said duct is regulated such that quench liquid discharged into the annular section between said baffles and said conduit flows over the upper edge of said second baffle, downwards across the inner surface of said second baffle, and is dispersed and completely vaporized into said gas stream adjacent to the lower end of said second baffle, thereby cooling said gas stream to a substantially constant lower temperature.

2. Apparatus for quenching a hot gas stream which comprises a vertically oriented cylindrical conduit, means to pass a hot gas stream upwards through said conduit, a first truncated conical baffle extending inwards and upwards from fluid-impervious attachment to the inner wall of said conduit, whereby the flow of hot gas is restricted and its velocity is increased, a second truncated conical baffle extending upwards and outwards from fluid-impervious attachment to the upper end of said first baffle, said second baffle terminating with an upper edge adjacent to the inner wall of said conduit, a water supply duct, said duct extending through the wall of said conduit, means to pass water through said duct, whereby said water passes into the annular section between said baffles and said conduit, a temperature sensitive element, said element being disposed within said conduit above said second baffle and serving to measure the temperature of said gas stream above said second baffle, a controller external to said conduit, means to transmit a signal proportional to gas stream temperature from said element to said controller, a control valve, said control valve being disposed within said duct, and means to transmit a control signal from said controller to said control valve, whereby the flow rate of water through said duct is regulated such that water discharged into the annular section between said baffles and said conduit flows over the upper edge of said second baffle, downwards across the inner surface of said second baffle, and is dispersed and completely vaporized into said gas stream adjacent to the lower end of said second baffle, thereby cooling said gas stream to a substantially constant lower temperature.

References Cited by the Examiner

UNITED STATES PATENTS

| 640,796 | 1/00 | Neuhs | 55—257 XR |
|---|---|---|---|
| 999,213 | 8/11 | Durant | 261—114 |
| 2,767,025 | 10/56 | Griffith | 261—39 XR |
| 3,092,677 | 6/63 | Spence | 261—39 XR |
| 3,112,352 | 11/63 | Krantz | 55—241 XR |
| 3,131,237 | 4/64 | Collins | 55—257 X |

FOREIGN PATENTS

| 624,542 | 4/27 | France. |
|---|---|---|
| 527,595 | 10/40 | Great Britain. |

HARRY B. THORNTON, *Primary Examiner.*